United States Patent
Park

(10) Patent No.: US 12,091,099 B2
(45) Date of Patent: Sep. 17, 2024

(54) AERODYNAMIC SYSTEM FOR VEHICLE

(71) Applicants: Hyundai Motor Company, Seoul (KR); Kia Corporation, Seoul (KR)

(72) Inventor: Yong Min Park, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 308 days.

(21) Appl. No.: 17/685,811

(22) Filed: Mar. 3, 2022

(65) Prior Publication Data
US 2022/0402565 A1    Dec. 22, 2022

(30) Foreign Application Priority Data

Jun. 22, 2021  (KR) .................. 10-2021-0081152

(51) Int. Cl.
*B62D 35/00*    (2006.01)

(52) U.S. Cl.
CPC ......... *B62D 35/007* (2013.01); *B62D 35/001* (2013.01)

(58) Field of Classification Search
CPC ...... B62D 35/00; B62D 35/005; B62D 35/02; B62D 37/00; B62D 37/02; B62D 37/04; B62D 37/06; B62D 35/007; B62D 35/001; B62D 25/08; Y02T 10/82; F15D 1/0065
See application file for complete search history.

(56) References Cited

U.S. PATENT DOCUMENTS

| | | | |
|---|---|---|---|
| 4,113,299 A | 9/1978 | Johnson et al. | |
| 4,379,582 A * | 4/1983 | Miwa | B62D 35/007 296/180.5 |
| 5,551,505 A * | 9/1996 | Freeland | F28F 9/001 165/41 |
| 10,906,597 B2 * | 2/2021 | Biancalana | B62D 35/005 |
| 11,352,076 B2 * | 6/2022 | Kay | B62D 35/005 |
| 2005/0161269 A1 * | 7/2005 | Khalighi | B62D 35/005 180/116 |
| 2007/0046067 A1 | 3/2007 | Verona | |
| 2012/0292122 A1 * | 11/2012 | Verbrugge | B60K 11/085 296/193.11 |
| 2013/0168999 A1 * | 7/2013 | Hitchcock | B62D 35/00 296/180.1 |
| 2015/0321547 A1 * | 11/2015 | Pickl | B62D 37/02 180/68.1 |
| 2016/0176385 A1 * | 6/2016 | Wolf | F16D 65/847 296/208 |
| 2016/0272257 A1 * | 9/2016 | McKillen | B62D 35/02 |
| 2016/0272258 A1 * | 9/2016 | Gibson | B62D 37/02 |
| 2017/0057566 A1 * | 3/2017 | Hommes | G07C 5/0808 |
| 2017/0082092 A1 * | 3/2017 | Gaither | F16D 65/847 |

(Continued)

FOREIGN PATENT DOCUMENTS

| | | | | |
|---|---|---|---|---|
| CA | 2319951 A1 * | 6/2001 | ............. | B60K 16/00 |
| CN | 101417647 A * | 4/2009 | ............... | B60T 5/00 |

(Continued)

*Primary Examiner* — Lori Lyjak
(74) *Attorney, Agent, or Firm* — MORGAN, LEWIS & BOCKIUS LLP

(57) ABSTRACT

An aerodynamic system for a vehicle, includes: an air duct guiding air flow from a front compartment to the outside of the vehicle; and a rotating body mounted in the air duct and rotatable in the air duct. The rotating body may have a rotation axis along a transverse direction of the vehicle, and the rotating body may rotate around the rotation axis.

15 Claims, 9 Drawing Sheets

(56) References Cited

U.S. PATENT DOCUMENTS

| | | | |
|---|---|---|---|
| 2017/0158257 A1* | 6/2017 | Fahland | B62D 35/02 |
| 2019/0031252 A1* | 1/2019 | Demetrio | B62D 35/02 |
| 2019/0118874 A1* | 4/2019 | Ibañez Moreira | F16D 65/807 |
| 2019/0176908 A1* | 6/2019 | Slight | B62D 35/02 |
| 2021/0001928 A1* | 1/2021 | Solazzo | B62D 35/005 |
| 2021/0101480 A1* | 4/2021 | Gaither | B60K 17/165 |

FOREIGN PATENT DOCUMENTS

| | | | | |
|---|---|---|---|---|
| DE | 102004027172 A1 * | 12/2005 | | B62D 35/00 |
| DE | 102007019125 A1 * | 12/2007 | | B62D 35/02 |
| DE | 202009001652 U1 * | 5/2009 | | B62D 35/00 |
| DE | 102008039726 A1 * | 3/2010 | | B60K 11/04 |
| DE | 102013225345 A1 * | 6/2014 | | B62D 25/16 |
| DE | 102014008357 A1 * | 12/2015 | | B62D 25/18 |
| DE | 102018202215 A1 * | 8/2019 | | |
| EP | 1108890 A2 * | 6/2001 | | B60K 16/00 |
| FR | 2848174 A1 * | 6/2004 | | B60B 19/10 |
| WO | WO-03013894 A2 * | 2/2003 | | B60K 11/08 |

\* cited by examiner

AERODYNAMIC SYSTEM FOR VEHICLE

CROSS-REFERENCE TO RELATED APPLICATION

The present application claims priority to Korean Patent Application No. 10-2021-0081152, filed on Jun. 22, 2021, the entire contents of which is incorporated herein for all purposes by this reference.

BACKGROUND OF THE INVENTION

Field of the Invention

The present invention relates to an aerodynamic system for a vehicle, and to an aerodynamic system for a vehicle configured for improving the aerodynamic performance of the vehicle by generating negative drag while the vehicle is driving.

Description of Related Art

The aerodynamic performance of a vehicle is one of key factors in the development stage of the vehicle. During the entire vehicle's driving, drag is usually determined by three components, and the present drag has a large impact on the aerodynamic performance of the vehicle. The factors for the generation of drag that affects the aerodynamic performance include the streamlined styling of the vehicle, unevenness in a vehicle lower structure, the shape of a front portion of the vehicle, etc. which are determined at the initial styling stage of the vehicle. To improve the aerodynamic performance of the vehicle, several factors must be properly considered.

The vehicle includes a front end portion, and a front compartment located behind the front end portion.

The front compartment is partitioned from a passenger compartment by a dash panel. The front compartment receives a powertrain apparatus and heat exchangers (a radiator, a condenser, an intercooler, etc.). The powertrain apparatus includes a power source such as an internal combustion engine (of an internal combustion engine vehicle) or a motor (of an electric vehicle), and related components (transmission, driveshaft, differential gear, axle, etc.) that convert power of the power source into the movement of the vehicle.

Furthermore, the vehicle includes a grille mounted on the front end portion, and an undercover located under the front compartment. The grille has a plurality of openings that allow ambient air to flow into the front compartment. The grille protects the powertrain apparatus, the heat exchangers, etc. received in the front compartment. The undercover has one or more holes for air exit. The aerodynamics of the vehicle may be improved by allowing the air to flow into the front compartment through the grille, and to flow (exit) from the front compartment toward the bottom portion of the vehicle through the holes in the undercover.

An aerodynamic system according to the related art may fail to effectively utilize the flow energy of air from the front compartment to the outside of the vehicle through the holes in the undercover while the vehicle is driving.

The information disclosed in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an aerodynamic system for a vehicle configured for improving the aerodynamic performance of the vehicle by generating negative drag using the flow energy of air directed toward the outside of the vehicle while the vehicle is driving.

According to various aspects of the present invention, an aerodynamic system for a vehicle may include: an air duct guiding air flow from a front compartment to the outside of the vehicle; and a rotating body rotatable in the air duct.

When the air is directed from the front compartment to the outside of the vehicle through the air duct while the vehicle is driving, the aerodynamic performance of the vehicle may be improved by implementing the Magnus effect in which a force acts on the rotating body as the rotating body rotates in the air duct.

The rotating body may have a rotation axis along a transverse direction of the vehicle, and the rotating body may rotate around the rotation axis.

As the air flows outwards through the air duct and the rotating body rotates around the rotation axis along the transverse direction of the vehicle, a pressure difference between the front-side pressure in front of the rotating body and a rear-side pressure behind the rotating body may occur. By generating negative drag in the opposite direction to the driving direction of the vehicle, the aerodynamic performance of the vehicle may be improved.

The aerodynamic system may further include a driving mechanism causing the rotating body to rotate in a predetermined rotation direction thereof. The driving mechanism may include an electric motor, and a transmission coupling the electric motor and the rotating body and transmitting power of the electric motor to the rotating body.

As the drive mechanism actively rotates the rotating body, the energy of air flowing outwards through the air duct may be actively utilized.

When air is directed toward the outside of the vehicle through the air duct while the vehicle is driving, the driving mechanism may cause the rotating body to rotate in the predetermined rotation direction to make the front-side pressure in front of the rotating body within the air duct lower than the rear-side pressure behind the rotating body. The rotation direction may be the same as a direction in which a front wheel of the vehicle rotates while the vehicle is driving.

As the rotating body is rotated by the driving mechanism in the same rotation direction as that of the front wheel of the vehicle, the front-side pressure in front of the rotating body may be lower than the rear-side pressure behind the rotating body. Due to a pressure difference between the front-side pressure and the rear-side pressure, the negative drag may be generated in the same direction as the driving direction of the vehicle, and thus the drag of the vehicle may be reduced and the aerodynamic performance of the vehicle may be improved.

The air duct may be mounted on an undercover located under the front compartment, the undercover may have a hole aligned with an outlet of the air duct, and an inlet of the air duct may face the front compartment.

As the inlet of the air duct faces the front compartment, and the outlet of the air duct is aligned with the hole of the undercover, the air may be rapidly directed from the front compartment to the bottom portion of the undercover through the air duct.

The rotating body may be internally disposed within the air duct. A front portion of the rotating body may be spaced from a front wall of the air duct, and a rear portion of the rotating body may be spaced from a rear wall of the air duct. According to various exemplary embodiments of the present invention, a front gap between the front portion of the rotating body and the front wall of the air duct may be the same as a rear gap between the rear portion of the rotating body and the rear wall of the air duct. According to another exemplary embodiment of the present invention, a front gap between the front portion of the rotating body and the front wall of the air duct may be less than a rear gap between the rear portion of the rotating body and the rear wall of the air duct.

As the rotating body is spaced from the front wall and the rear wall of the air duct with the gaps therebetween, a front-side space of the air duct in front of the rotating body may be defined between the front portion of the rotating body and the front wall of the air duct, and a rear-side space of the air duct behind the rotating body may be defined between the rear portion of the rotating body and the rear wall of the air duct. As the rotating body rotates within the air duct, a pressure difference may occur between the front-side space of the air duct in front of the rotating body and the rear-side space of the air duct behind the rotating body.

The rotation axis of the rotating body may be aligned with that of a front wheel of the vehicle.

The rotation axis of the rotating body may be located in front of that of a front wheel of the vehicle.

The rotation axis of the rotating body may be located behind that of a front wheel of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
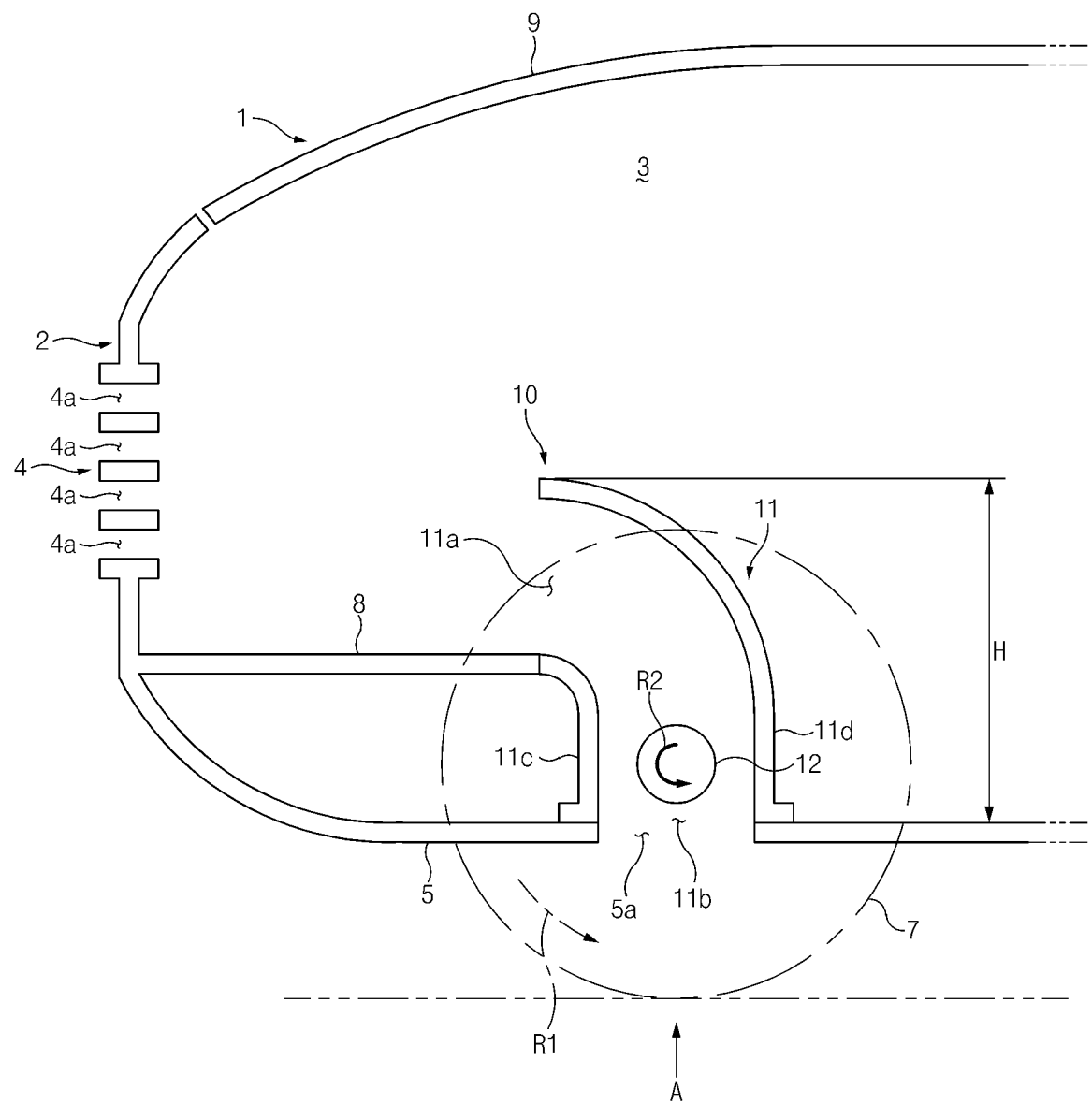
FIG. 1 illustrates an aerodynamic system for a vehicle according to various exemplary embodiments of the present invention, which is disposed on the front of the vehicle.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings. In the drawings, the same reference numerals will be used throughout to designate the same or equivalent elements. Furthermore, a detailed description of well-known techniques associated with the present invention will be ruled out in order not to unnecessarily obscure the gist of the present invention.

Terms such as first, second, A, B, (a), and (b) may be used to describe the elements in exemplary embodiments of the present invention. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which various exemplary embodiments of the present invention belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a vehicle 1 may include a front end portion 2, and a front compartment 3 located behind the front end portion 2.

The front compartment 3 may be partitioned from a passenger compartment by a dash panel (also referred to as a "firewall"). The front compartment 3 may receive a powertrain apparatus and heat exchangers (a radiator, a condenser, an intercooler, etc.). The powertrain apparatus includes a power source such as an internal combustion engine (of an internal combustion engine vehicle) or a motor (of an electric vehicle), and related components (transmission, driveshaft, differential gear, axle, etc.) that convert power of the power source into the movement of the vehicle. A support 8 supporting some components of the powertrain apparatus, the heat exchangers, and the like may be disposed on a lower portion of the front compartment 3, and a top portion of the front compartment 3 may be opened or closed by a hood 9.

Furthermore, the vehicle may include a grille 4 mounted on the front end portion 2, and an undercover 5 located under the front compartment 3. The grille 4 may have a plurality of openings 4a that allow ambient air to flow into the front compartment. The grille 4 may protect the powertrain apparatus, the heat exchangers, etc. received in the front compartment 3. The undercover 5 may have at least one hole 5a for air exit. The hole 5a in the undercover 5 may extend in a width direction of the vehicle.

Referring to FIG. 1, an aerodynamic system 10 for a vehicle according to various exemplary embodiments of the present invention may include an air duct 11 guiding air flow from the front compartment 3 to the outside of the vehicle 1.

The air duct 11 may be configured to fluidly connect the front compartment 3 and the outside of the vehicle 1. The air duct 11 may include an inlet 11a facing the front compartment 3 and an outlet 11b facing the outside of the vehicle. The inlet 11a may be provided in a top end portion of the air duct 11, and the outlet 11b may be provided in a bottom end portion of the air duct 11. As the outlet 11b of the air duct 11 is aligned with the hole 5a of the undercover 5, the outlet 11b of the air duct 11 may be opened to the bottom portion of the undercover 5. The inlet 11a of the air duct 11 may face the front compartment 3, and the outlet 11b of the air duct 11 may be aligned with the hole 5a of the undercover 5 so that the air may be rapidly directed from the front compartment 3 to the bottom portion of the undercover 5 through the air duct 11.

Referring to FIG. 1, a portion of the air duct 11 adjacent to the inlet 11a may be curved toward the grille 4, and thus the air flowing into the front compartment 3 through the grille 4 may be rapidly directed into the air duct 11.

According to various exemplary embodiments of the present invention, the air duct 11 may be fixed to the undercover 5 using fasteners, welding, and/or the like.

According to another exemplary embodiment of the present invention, the air duct 11 and the undercover 5 may form a unitary one-piece structure.

Figure 2:
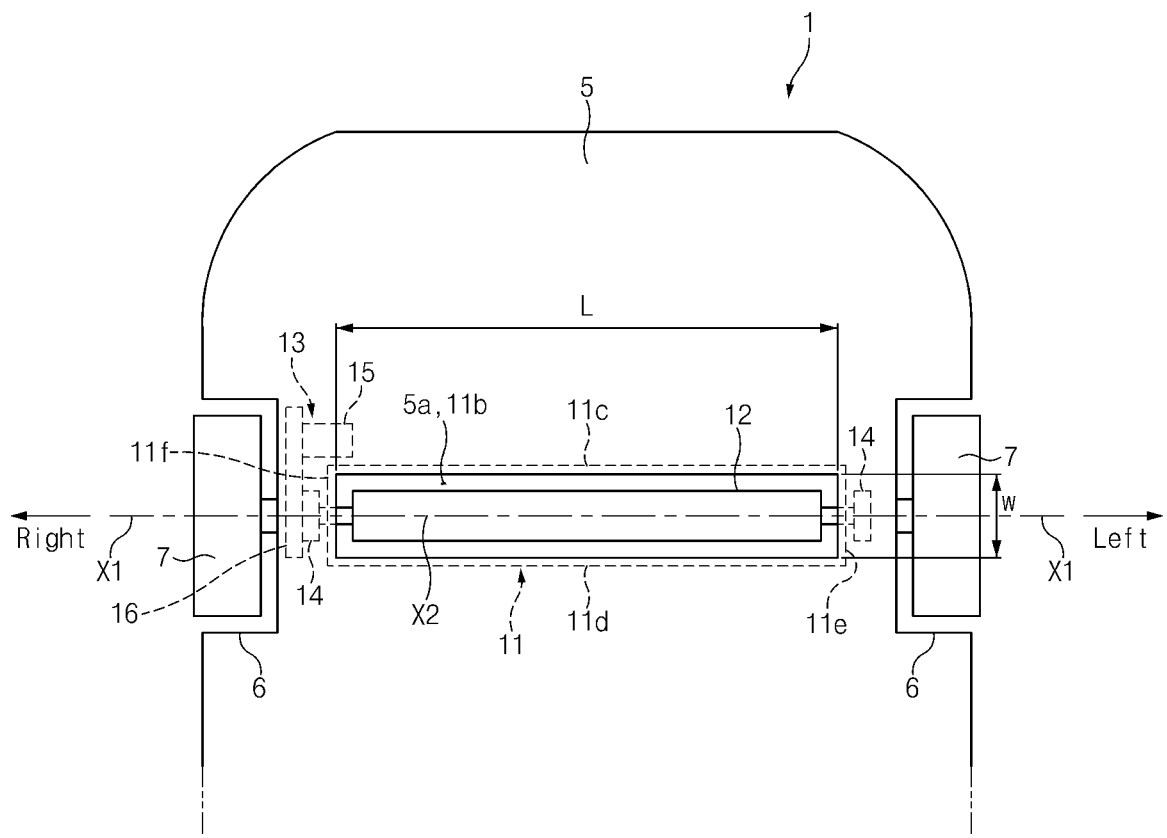
FIG. 2 illustrates a bottom view which is viewed in a direction indicated by arrow one of FIG. 1.

Referring to FIG. 1, a height H of the air duct 11 refers to a dimension extending in a height direction of the vehicle. Referring to FIG. 2, a width W of the air duct 11 refers to a dimension extending in a longitudinal direction of the vehicle, and a length L of the air duct 11 refers to a dimension extending in the width direction of the vehicle.

Referring to FIG. 2, the air duct 11 may have a front wall 11c facing the front of the vehicle, a rear wall 11d facing the rear of the vehicle, a left wall 11e facing the left side of the vehicle, and a right wall 11f facing the right side of the vehicle.

Referring to FIG. 2, the air duct 11 may extend between front wheel houses 6 of the vehicle 1 in the width direction of the vehicle. Each front wheel house 6 may have a cavity in which a corresponding front wheel 7 is received, and each front wheel 7 may rotate around a rotation axis X1 in the cavity of the corresponding front wheel house 6.

Referring to FIG. 1 and FIG. 2, the aerodynamic system 10 for a vehicle according to various exemplary embodiments of the present invention may include a rotating body 12 rotatable in the air duct 11, and a driving mechanism 13 causing the rotating body 12 to rotate.

The rotating body 12 may have a rotation axis X2 extending along the width (or transverse) direction of the vehicle, and the rotating body 12 may rotate around the rotation axis X2. Both end portions of the rotating body 12 may be rotatably supported by a pair of rotational supports 14 such as bearings, respectively. Referring to FIG. 2, the rotation axis X2 of the rotating body 12 may be aligned with the rotation axis X1 of each front wheel 7.

Figure 3:
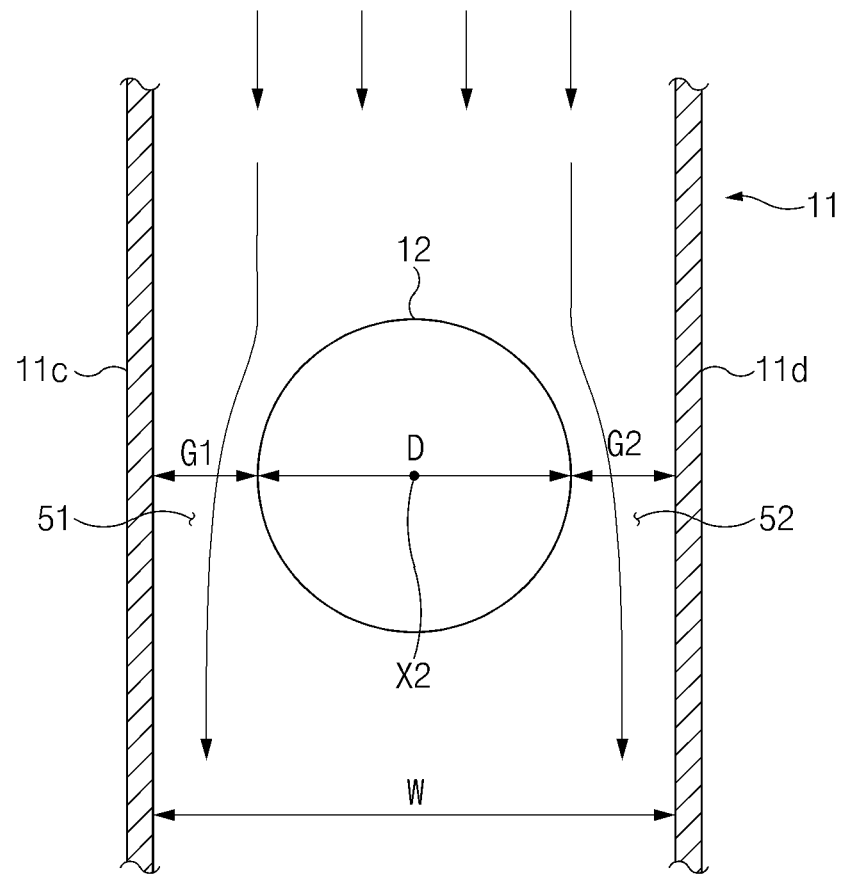
FIG. 3 illustrates a state in which a rotating body does not rotate in an air duct in an aerodynamic system for a vehicle according to various exemplary embodiments of the present invention.

Referring to FIG. 1, the rotating body 12 may be disposed between the inlet 11a and the outlet 11b of the air duct 11 in the height direction of the vehicle. Referring to FIG. 2 and FIG. 3, the rotating body 12 may be disposed between the front wall 11c and the rear wall 11d of the air duct 11 in the longitudinal direction of the vehicle. A front portion of the rotating body 12 may be spaced from the front wall 11c of the air duct 11, and a rear portion of the rotating body 12 may be spaced from the rear wall 11d of the air duct 11. A front-side space 51 of the air duct 11 in front of the rotating body 12 may be defined between the front portion of the rotating body 12 and the front wall 11c of the air duct 11, and a rear-side space 52 of the air duct 11 behind the rotating body 12 may be defined between the rear portion of the rotating body 12 and the rear wall 11d of the air duct 11.

Figure 4:
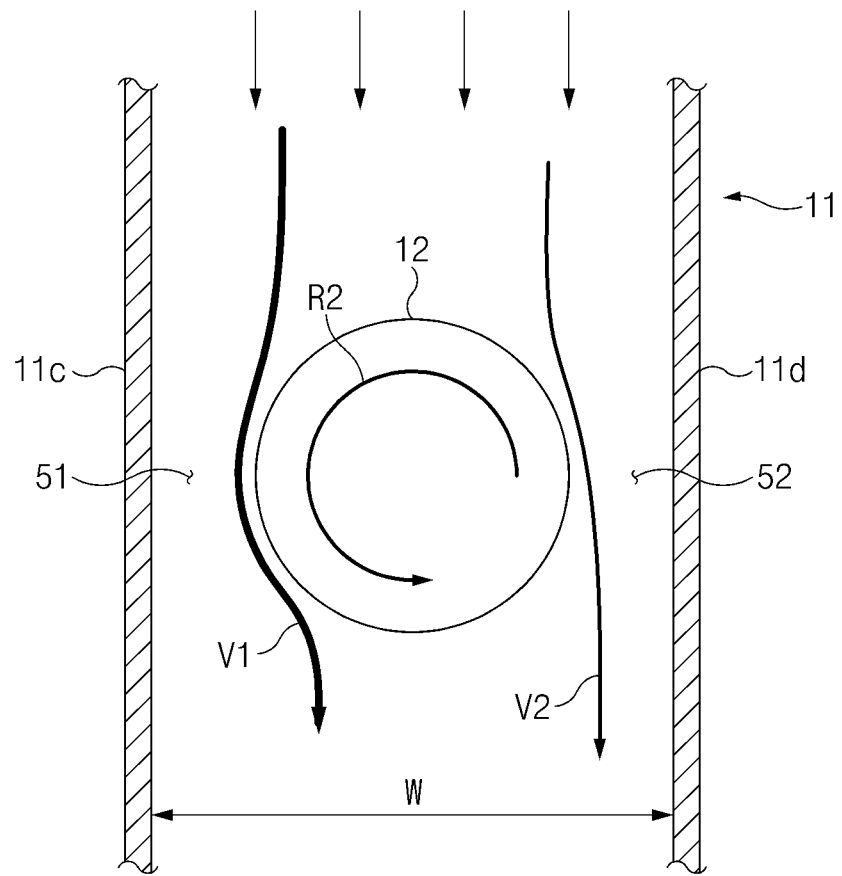
FIG. 4 illustrates a state in which a rotating body rotates in an air duct in an aerodynamic system for a vehicle according to various exemplary embodiments of the present invention.
Figure 5:
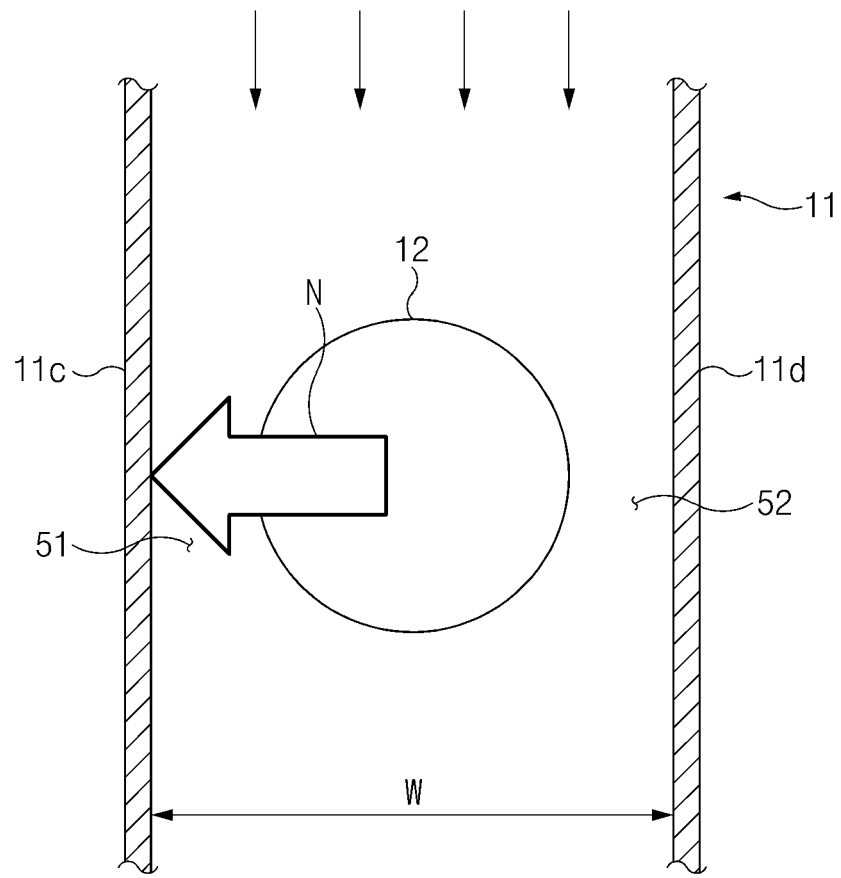
FIG. 5 illustrates a state in which negative drag is generated as a rotating body rotates in an air duct in an aerodynamic system for a vehicle according to various exemplary embodiments of the present invention.

Referring to FIG. 3, FIG. 4, and FIG. 5, a diameter D of the rotating body 12 may be less than the width W of the air duct 11. A front gap G1 between the front portion of the rotating body 12 and the front wall 11c of the air duct 11 may be the same as a rear gap G2 between the rear portion of the rotating body 12 and the rear wall 11d of the air duct 11 so that the front-side space 51 of the air duct 11 in front of the rotating body 12 and the rear-side space 52 of the air duct 11 behind the rotating body 12 may have the same volume.

Referring to FIG. 2, the driving mechanism 13 may allow the rotating body 12 to rotate in a predetermined rotation direction. According to various exemplary embodiments of the present invention, the driving mechanism 13 may include an electric motor 15, and a transmission 16 transmitting power of the electric motor 15 to the rotating body 12. For example, the transmission 16 may include various transmission mechanisms such as a belt transmission mechanism and a gear train for transmitting a torque of the electric motor 15 to the rotating body 12.

Referring to FIG. 3, when the rotating body 12 does not rotate in the air duct 11, the air passing through the air duct 11 may be uniformly distributed to the front-side space 51 and the rear-side space 52, and a front-side pressure in front of the rotating body 12 may be the same as a rear-side pressure behind the rotating body 12. The front-side pressure in front of the rotating body 12 may be an air pressure acting in the front-side space 51 of the air duct 11 in front of the rotating body 12, and the rear-side pressure behind the rotating body 12 may be an air pressure acting in the rear-side space 52 of the air duct 11 behind the rotating body 12.

Referring to FIGS. 1 and 4, the driving mechanism 13 may cause the rotating body 12 to rotate in a predetermined rotation direction R2. Here, the rotation direction R2 of the rotating body 12 may be the same as a rotation direction R1 of the front wheel 7 of the vehicle 1.

During the vehicle's driving, when the rotating body 12 is rotated by the driving mechanism 13 in the same rotation direction R2 (a counterclockwise direction in FIG. 4) as that of the front wheel 7 of the vehicle 1 in a state in which the air flows through the air duct 11, a velocity V1 of the air passing through the front-side space 51 in front of the rotation body 12 may be faster than a velocity V2 of the air passing through the rear-side space 52 behind the rotation body 12, and thus the front-side pressure in front of the rotating body 12 may be lower than the rear-side pressure behind the rotating body 12. As the rotating body 12 rotates in the rotation direction R2 which is the same as the rotation direction R1 of the front wheel 7 of the vehicle, a pressure difference between the front-side pressure in front of the rotating body 12 and the rear-side pressure behind the rotating body 12 may occur. Thus, as illustrated in FIG. 5, the Magnus effect in which negative drag N acts on the rotating body 12 in the same direction as the driving direction of the vehicle may be achieved. Since the rotating body 12 is connected to a vehicle body of the vehicle, the negative drag may equally act on the vehicle. While the vehicle is driving, drag (referred to as "positive drag" or "aerodynamic drag") acts opposite to the driving direction of the vehicle. However, the aerodynamic system 10 according to exemplary embodiments of the present invention may generate the negative drag N that acts in the opposite direction to the positive drag by the rotation of the rotating body 12, reducing the drag of the vehicle and improving the aerodynamic performance of the vehicle.

Figure 6:
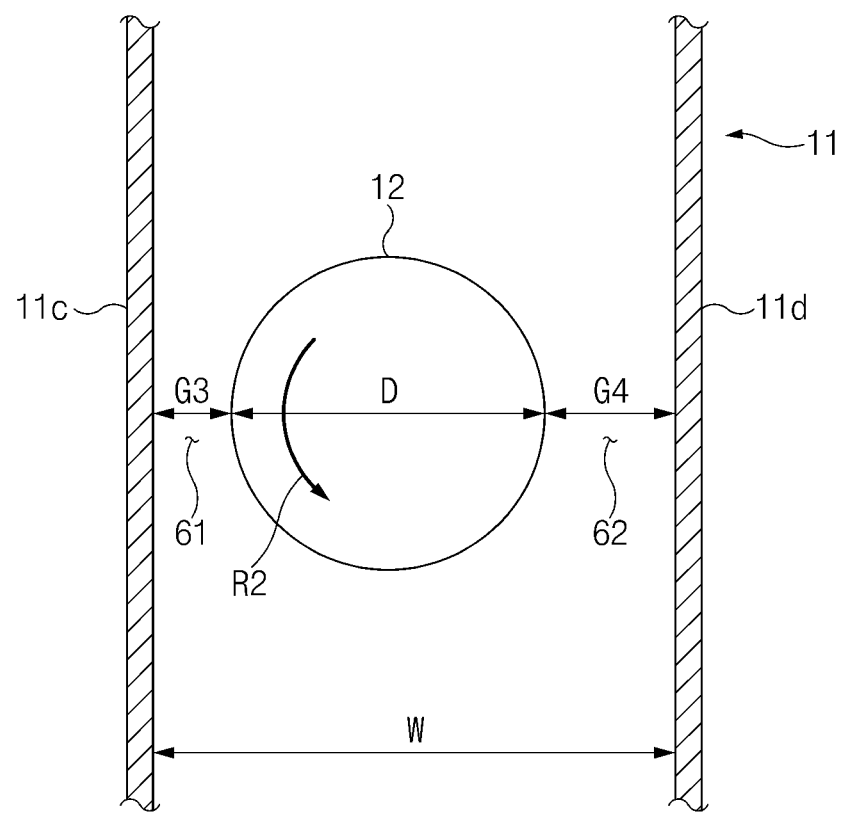
FIG. 6 illustrates a modification to the exemplary embodiment of FIG. 3.

According to various exemplary embodiments of the present invention, as illustrated in FIG. 6, the rotating body 12 may be relatively adjacent to the front wall 11c in the air duct 11, and a front gap G3 between the front portion of the rotating body 12 and the front wall 11c of the air duct 11 may be less than a rear gap G4 between the rear portion of the rotating body 12 and the rear wall 11d of the air duct 11. Thus, a front-side space 61 of the air duct 11 in front of the rotating body 12 may have a smaller volume than that of a rear-side space 62 of the air duct 11 behind the rotating body 12. When the rotating body 12 rotates in the same rotation direction R2 as the rotation direction R1 of the front wheel 7 of the vehicle during the driving of the vehicle, a velocity of the air passing through the front-side space 61 may be relatively faster than that in the exemplary embodiment of FIG. 3, FIG. 4, and FIG. 5. Accordingly, a pressure difference between the front-side pressure in front of the rotating body 12 and the rear-side pressure behind the rotating body 12 may increase compared to the exemplary embodiment of FIG. 3, FIG. 4, and FIG. 5, and thus the greater negative drag with respect to the rotating body 12 may be generated. Furthermore, since the front-side space 61 in front of the rotating body 12 has a relatively narrow cross-section compared to the rear-side space 62 behind the rotating body 12, the negative drag due to the Magnus effect may be generated more smoothly even when a rotation speed of the rotating body 12 is relatively reduced.

According to various exemplary embodiments of the present invention, as illustrated in FIG. 2, the rotation axis X2 of the rotating body 12 may be aligned with the rotation axis X1 of the front wheel 7.

Figure 7:
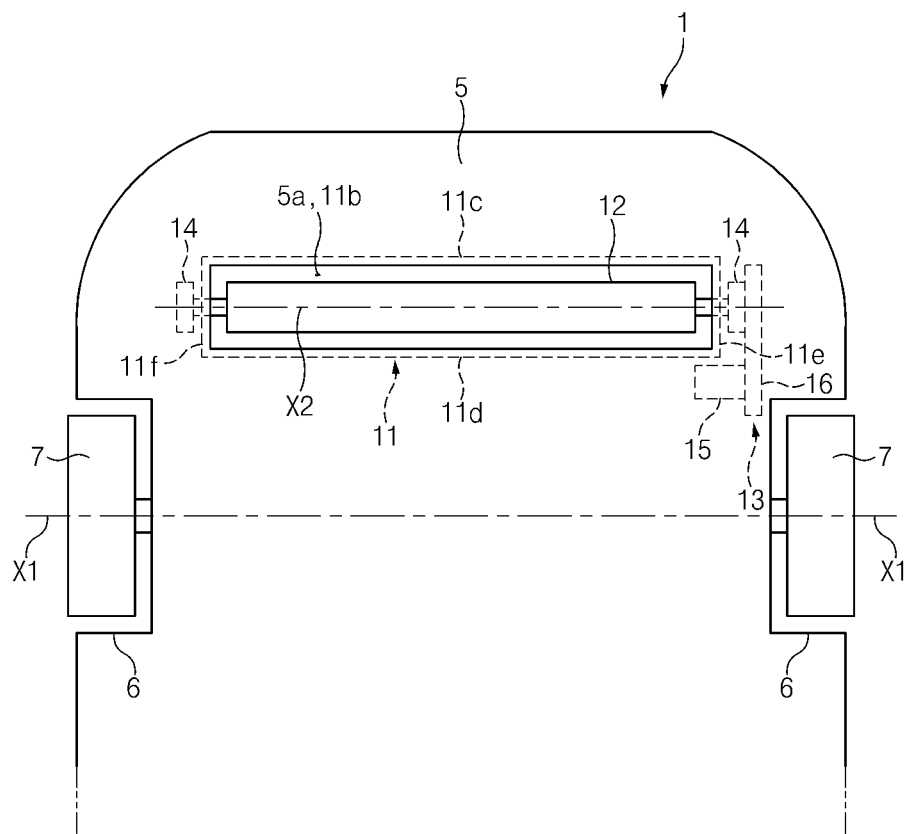
FIG. 7 illustrates a modification to the exemplary embodiment of FIG. 2.

According to another exemplary embodiment of the present invention, as illustrated in FIG. 7, the rotation axis X2 of the rotating body 12 may be located in front of the rotation axis X1 of the front wheel 7, and thus the rotation axis X2 of the rotating body 12 may be closer to the front of the vehicle than the rotation axis X1 of the front wheel 7.

Figure 8:
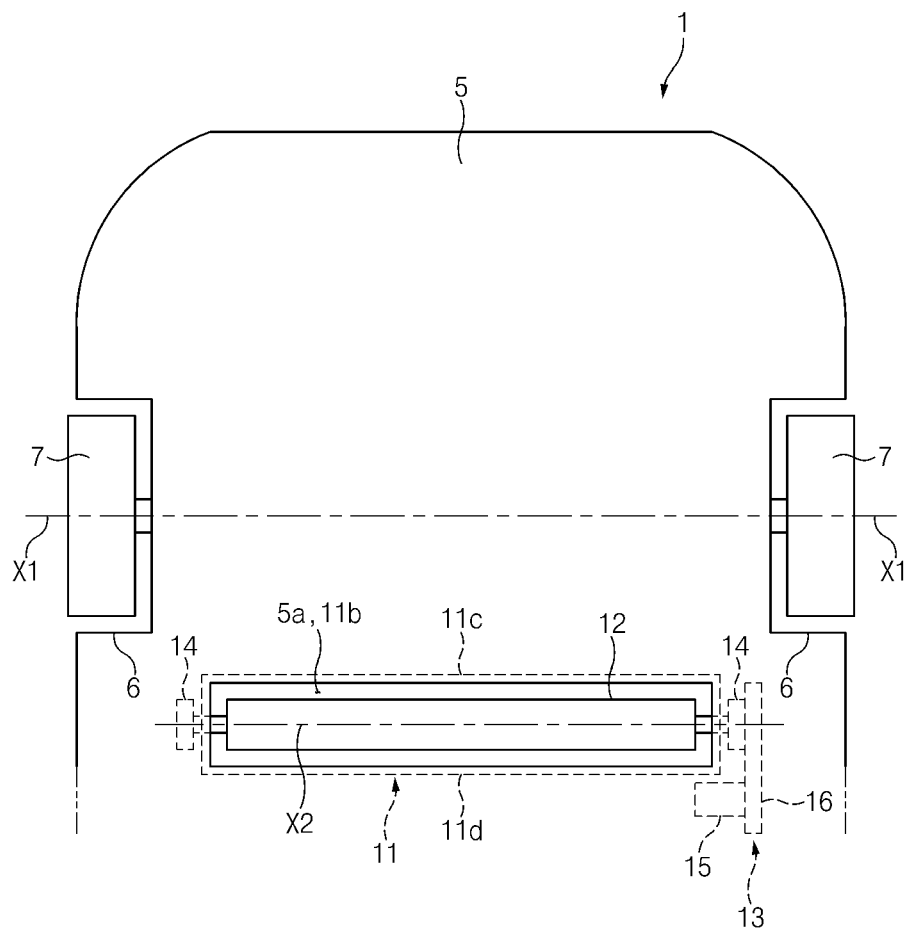
FIG. 8 illustrates another modification to the exemplary embodiment of FIG. 2.

According to another exemplary embodiment of the present invention, as illustrated in FIG. 8, the rotation axis X2 of the rotating body 12 may be located behind the rotation axis X1 of the front wheel 7, and thus the rotation axis X2 of the rotating body 12 may be closer to the rear of the vehicle than the rotation axis X1 of the front wheel 7.

Figure 9:
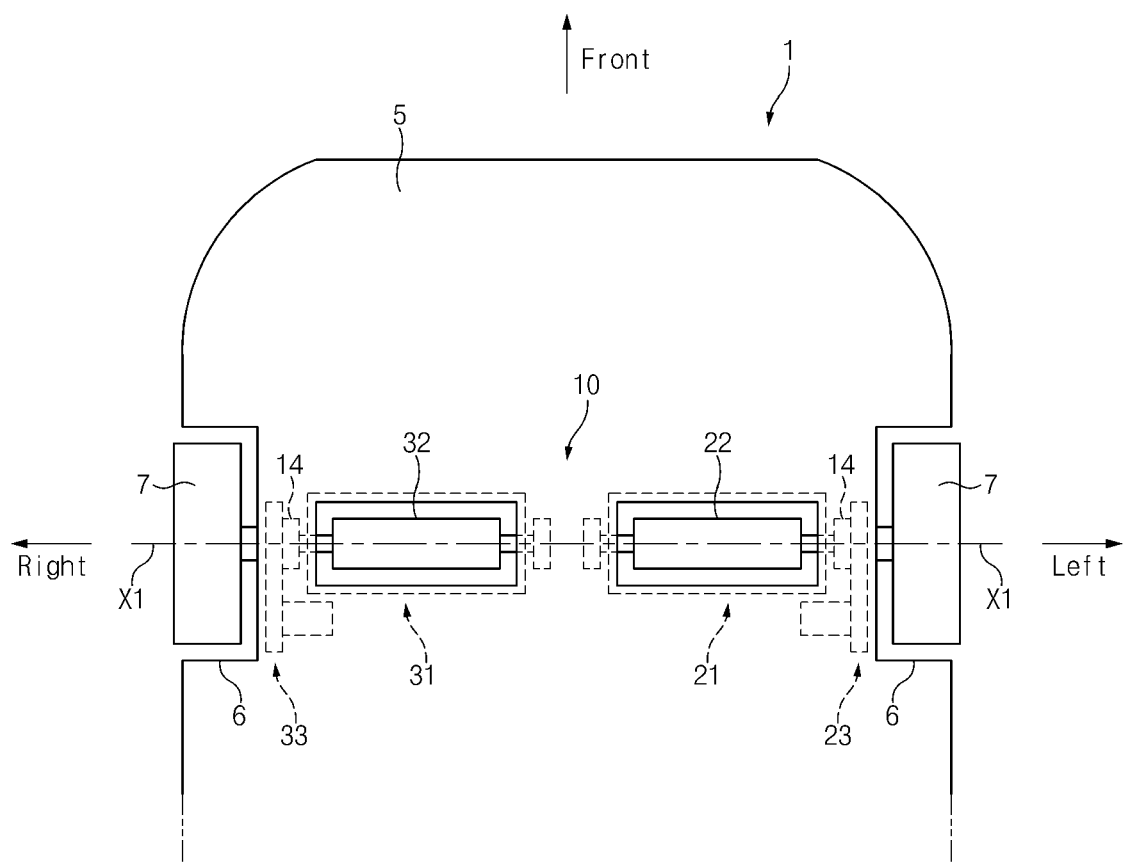
FIG. 9 illustrates a bottom view of an aerodynamic system for a vehicle according to various exemplary embodiments of the present invention, which is disposed on the front of the vehicle.

Referring to FIG. 9, the aerodynamic system 10 for a vehicle according to various exemplary embodiments of the present invention may include a plurality of air ducts 21 and 31, a plurality of rotating bodies 22 and 32 rotatable in the plurality of air ducts 21 and 31, respectively, and a plurality of driving mechanisms 23 and 33 causing the plurality of rotating bodies 22 and 32 to rotate, respectively. The undercover 5 may have a plurality of holes aligned with the plurality of air ducts 21 and 31, respectively. For example, the two air ducts 21 and 31 may be disposed symmetrically on the left and right sides of the vehicle. That is, a left air duct 21 may be disposed on the left side of the vehicle, and a right air duct 31 may be disposed on the right side of the vehicle. A left rotating body 22 may be rotatable in the left air duct 21, and a right rotating body 32 may be rotatable in the right air duct 31. A left driving mechanism 23 may cause the left rotating body 22 to rotate, and a right driving mechanism 33 may cause the right rotating body 32 to rotate. The two driving mechanisms 23 and 33 may allow the corresponding rotating bodies 22 and 33 to rotate at different speeds so that different magnitudes of negative drag on the left and right sides of the vehicle may be generated.

In an exemplary embodiment of the present invention, the driving mechanism 13, 23 and 33 may be connected to a controller to control the rotation of the motors in the driving mechanism 13, 23 and 33.

As set forth above, the aerodynamic system for a vehicle according to exemplary embodiments of the present invention may generate the negative drag using the flow energy of air directed toward the outside of the vehicle during the vehicle's driving, achieving the drag reduction and improving the aerodynamic performance of the vehicle.

In addition, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

In an exemplary embodiment of the present invention, each operation described above may be performed by a control device, and the control device may be configured by multiple control devices, or an integrated single control device.

In an exemplary embodiment of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An aerodynamic system for a vehicle, the aerodynamic system comprising:
   an air duct guiding air flow from a front compartment to the outside of the vehicle;
   a rotating body mounted in the air duct and rotatable in the air duct; and
   a driving mechanism configured for rotating the rotating body in a predetermined rotation direction.

2. The aerodynamic system of claim 1,
   wherein the rotating body has a rotation axis aligned in a transverse direction of the vehicle, and
   wherein the rotating body rotates around the rotation axis.

3. The aerodynamic system of claim 1,
   wherein the driving mechanism includes an electric motor, and a transmission coupling the electric motor to the rotating body and transmitting power of the electric motor to the rotating body.

4. The aerodynamic system of claim 1,
   wherein when air is directed toward the outside of the vehicle through the air duct while the vehicle is driving, the driving mechanism is configured to rotate the rotating body in the predetermined rotation direction to make a front-side pressure in front of the rotating body within the air duct lower than a rear-side pressure behind the rotating body within the air duct.

5. The aerodynamic system of claim 4,
   wherein the predetermined rotation direction is a same as a direction in which a front wheel of the vehicle rotates while the vehicle is driving.

6. The aerodynamic system of claim 1,
   wherein the air duct is mounted on an undercover located under the front compartment,
   wherein the undercover has a hole aligned with an outlet of the air duct, and
   wherein an inlet of the air duct is aligned to face the front compartment.

7. The aerodynamic system of claim 6, wherein the inlet of the air duct is aligned to face a grille of the vehicle in the front compartment so that the air flowing into the front compartment through the grille is directed into the inlet of the air duct.

8. The aerodynamic system of claim 1,
   wherein the rotating body is internally disposed within the air duct,
   wherein a front portion of the rotating body is spaced from a front wall of the air duct, and
   wherein a rear portion of the rotating body is spaced from a rear wall of the air duct.

9. The aerodynamic system of claim 8,
   wherein a length in a front gap between the front portion of the rotating body and the front wall of the air duct is a same as a length in a rear gap between the rear portion of the rotating body and the rear wall of the air duct.

10. The aerodynamic system of claim 8,
    wherein a length in a front gap between the front portion of the rotating body and the front wall of the air duct is less than a length in a rear gap between the rear portion of the rotating body and the rear wall of the air duct.

11. The aerodynamic system of claim 2,
    wherein the rotation axis of the rotating body is aligned with a rotation axis of a front wheel of the vehicle.

12. The aerodynamic system of claim 2,
    wherein the rotation axis of the rotating body is located in front of a rotation axis of a front wheel of the vehicle in a longitudinal direction of the vehicle.

13. The aerodynamic system of claim 2,
    wherein the rotation axis of the rotating body is located behind a rotation axis of a front wheel of the vehicle in a longitudinal direction of the vehicle.

14. The aerodynamic system of claim 2,
    wherein the air duct is in plural,
    wherein the rotating body is in plural,
    wherein the plurality of air ducts guides the air flow from the front compartment to the outside of the vehicle therethrough;
    wherein each rotating body is rotatably mounted in a corresponding air duct among the plurality of air ducts; and
    wherein the plurality of air ducts is mounted on an undercover located under the front compartment and aligned in series in a traverse direction of the vehicle.

15. The aerodynamic system of claim 14, further including:
    a plurality of driving mechanism configured for rotating the plurality of rotating bodies in a predetermined rotation direction.

\* \* \* \* \*